United States Patent
Jain et al.

(10) Patent No.: US 11,934,357 B2
(45) Date of Patent: Mar. 19, 2024

(54) DROPSITE FOR SHARED CONTENT

(71) Applicant: Dropbox, Inc., San Francisco, CA (US)

(72) Inventors: Tushar Jain, San Francisco, CA (US);
Yi Wei, San Francisco, CA (US);
Michael Dwan, Boulder, CO (US)

(73) Assignee: DROPBOX, INC., San Francisco, CA (US)

( * ) Notice: Subject to any disclaimer, the term of this patent is extended or adjusted under 35 U.S.C. 154(b) by 418 days.

(21) Appl. No.: 17/338,245

(22) Filed: Jun. 3, 2021

(65) Prior Publication Data

US 2021/0286771 A1    Sep. 16, 2021

Related U.S. Application Data

(63) Continuation of application No. 15/829,895, filed on Dec. 2, 2017, now Pat. No. 11,106,636, which is a continuation of application No. 13/914,582, filed on Jun. 10, 2013, now abandoned.

(51) Int. Cl.
| | | |
|---|---|---|
| G06F 16/00 | (2019.01) | |
| G06F 16/13 | (2019.01) | |
| G06F 16/178 | (2019.01) | |
| G06F 16/182 | (2019.01) | |
| G06F 16/48 | (2019.01) | |
| G06F 16/487 | (2019.01) | |

(52) U.S. Cl.
CPC ............ *G06F 16/182* (2019.01); *G06F 16/13* (2019.01); *G06F 16/178* (2019.01); *G06F 16/48* (2019.01); *G06F 16/487* (2019.01); *G06F 16/489* (2019.01)

(58) Field of Classification Search
CPC ...... G06F 16/182; G06F 16/13; G06F 16/178; G06F 16/48; G06F 16/487; G06F 16/489
See application file for complete search history.

(56) References Cited

U.S. PATENT DOCUMENTS

| | | | |
|---|---|---|---|
| 8,307,046 B2 | 11/2012 | Ortiz et al. | |
| 8,327,012 B1 | 12/2012 | Nguyen et al. | |
| 9,569,451 B1* | 2/2017 | Crager | G06F 16/16 |
| 2012/0204235 A1* | 8/2012 | Jaudon | G06F 21/30 |
| | | | 726/4 |
| 2012/0213404 A1 | 8/2012 | Steiner | |
| 2012/0221639 A1 | 8/2012 | Mallet et al. | |
| 2012/0222133 A1 | 8/2012 | Kidron | |
| 2012/0246244 A1 | 9/2012 | Mallet et al. | |
| 2012/0246266 A1 | 9/2012 | Mallet et al. | |
| 2012/0324002 A1 | 12/2012 | Chen et al. | |

(Continued)

OTHER PUBLICATIONS

Advisory Action from U.S. Appl. No. 15/829,895, dated Jan. 27, 2021, 3 pages.

(Continued)

*Primary Examiner* — Paul Kim
(74) *Attorney, Agent, or Firm* — Fenwick & West LLP

(57) ABSTRACT

Embodiments are provided for a dropsite. In some embodiments, information is received on a creation location and a date and time of creation of a content item, and a determination is made if (i) the date and time of creation is within a predefined span of time, and (ii) the creation location is within a predefined geographical area to permit association of the content item with a shared folder whose inclusion criteria match said date and time and geographic location.

18 Claims, 13 Drawing Sheets

(56) References Cited

U.S. PATENT DOCUMENTS

| | | |
|---|---|---|
| 2013/0012242 A1 | 1/2013 | Nag et al. |
| 2013/0047061 A1 | 2/2013 | Soin et al. |
| 2013/0066963 A1 | 3/2013 | Odio et al. |
| 2013/0212486 A1 | 8/2013 | Joshi et al. |
| 2013/0219458 A1 | 8/2013 | Ramanathan et al. |
| 2013/0222369 A1 | 8/2013 | Huston et al. |
| 2013/0238706 A1 | 9/2013 | Desai |
| 2013/0244624 A1 | 9/2013 | Das et al. |
| 2013/0275505 A1 | 10/2013 | Gauglitz et al. |
| 2013/0318582 A1 | 11/2013 | McCann et al. |
| 2014/0052738 A1* | 2/2014 | Connell-Giammatteo ........ G11B 27/031 707/748 |
| 2014/0149529 A1 | 5/2014 | McLellan et al. |
| 2014/0259179 A1 | 9/2014 | Leppanen et al. |
| 2016/0034459 A1 | 2/2016 | Larsen et al. |
| 2018/0316633 A1 | 11/2018 | Mo |

OTHER PUBLICATIONS

Advisory Action from U.S. Appl. No. 15/829,895, dated May 13, 2020, 3 pages.

"DropEvent-Collaborative Photo Galleries," DropEvent.com, Apr. 11, 2013, retrieved from http://dropevent.com/dropevent/Home/FAQ on Apr. 23, 2013, pp. 1-3.

Final Office Action from U.S. Appl. No. 15/829,895, dated Dec. 31, 2020, 19 pages.

Final Office Action from U.S. Appl. No. 15/829,895, dated Mar. 18, 2020, 19 pages.

"Sharypic—Event Photo Sharing Sharypic SAS itunes," retrieved from https://itunes.apple.com/us/app/sharypic-event-photo-sharing/id490922939?mt=8 on Apr. 23, 2013, 2 pages.

Non-Final Office Action from U.S. Appl. No. 15/829,895, dated Jun. 11, 2020, 23 pages.

Non-Final Office Action from U.S. Appl. No. 15/829,895, dated Oct. 7, 2019, 15 pages.

Notice of Allowance from U.S. Appl. No. 15/829,895, dated Mar. 26, 2021, 7 pages.

Young K "Highlight-unveils location-focused photo sharing tool and event feature with an eye for spontaneity," Feb. 20, 2013, pp. 1-4.

* cited by examiner sharedTable
600

| Sharer 604 | Shared Item 606 | Shared Folder 608 | Location 609 | Timestamp 610 | Active 612 | Viewed 614 |
|---|---|---|---|---|---|---|
| userId1 | Item100b | Folder1 | CoordinatesA | 08:00:00 May 15, 2012 | 1 | 0 |
| userId2 | Item200b | Folder1 | CoordinatesB | 08:00:00 May 15, 2012 | 1 | 1 |
| userId1 | Item100a | Folder1 | CoordinatesA | 08:00:00 May 15, 2012 | 0 | 0 | contentItemTable
602

| UserId 620 | ContentItemId 622 | OriginalContentId 624 | CurrentSynchCopy 626 | Active 628 | DeviceId 630 | Revision 632 | ContentPointer 634 |
|---|---|---|---|---|---|---|---|
| userId2 | 200b | 200 | 1 | 1 | mobile1 | N/A | Ptr3 |
| userId1 | 100b | 100 | 1 | 1 | mobile2 | 2 | Ptr2 |
| userId1 | 100a | 100 | 0 | 0 | Tablet1 | 1 | Ptr1 |

FIG. 6A

DropsiteTable 603

| SharedFolder 650 | Geographic area 652 | TimeAndDate 654 | Current 656 | Active 658 | OwnerId 660 | Public 662 |
|---|---|---|---|---|---|---|
| Folder1 | AreaCoordinatesA | 08:00:00 to 24:00:00 May 15, 2012 | 1 | 1 | userId1 | 1 |
| Folder2 | AreaCoordinatesB | 13:00:00 to 24:00:00 May 16, 2012 | 1 | 1 | userId2 | 0 |
| Folder3 | AreaCoordinatesB | 08:00:00 to 12:00:00 May 16, 2012 | 0 | 0 | userId3 | 1 |

DROPSITE FOR SHARED CONTENT

CROSS REFERENCE TO RELATED APPLICATIONS

This application is a continuation of U.S. application Ser. No. 15/829,895, filed Dec. 2, 2017, which application is a continuation of U.S. application Ser. No. 13/914,582, filed Jun. 10, 2013, now abandoned, all of which are incorporated by reference in their entirety.

FIELD OF THE INVENTION

Various embodiments relate generally to a dropsite for shared content.

BACKGROUND

With various web and mobile applications, a user is able to indiscriminately upload photos of, and post reviews for, particular restaurants, stores or other establishments. Although such photos and critiques are intended to educate the general public on the restaurant or establishment in question, they are often not validated as having actually been captured at the restaurant. Moreover, the photos and reviews are not organized in any meaningful way to provide an accurate depiction of an actual experience at the restaurant or venue at any particular snapshot in time. As such, such reviews and photos are disjointed at best, and at worst wholly inaccurate.

Accordingly, there is a need to both capture and share a user experience in an organized way.

SUMMARY

Embodiments are provided for a dropsite. In some embodiments, information is received on a creation location and a date and time of creation of a content item, and a determination is made if (i) the date and time of creation is within a predefined span of time, and (ii) the creation location is within a predefined geographical area to permit association of the content item with a shared folder whose inclusion criteria match said date and time and geographic location.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIG. 6A is an exemplary schematic representation for storage of data for a dropsite for shared content in accordance with some embodiments of the invention;

FIG. 6B is an exemplary schematic representation for storage of data for a dropsite for shared content in accordance with some embodiments of the invention;

DETAILED DESCRIPTION OF THE DISCLOSURE

Figure 1:
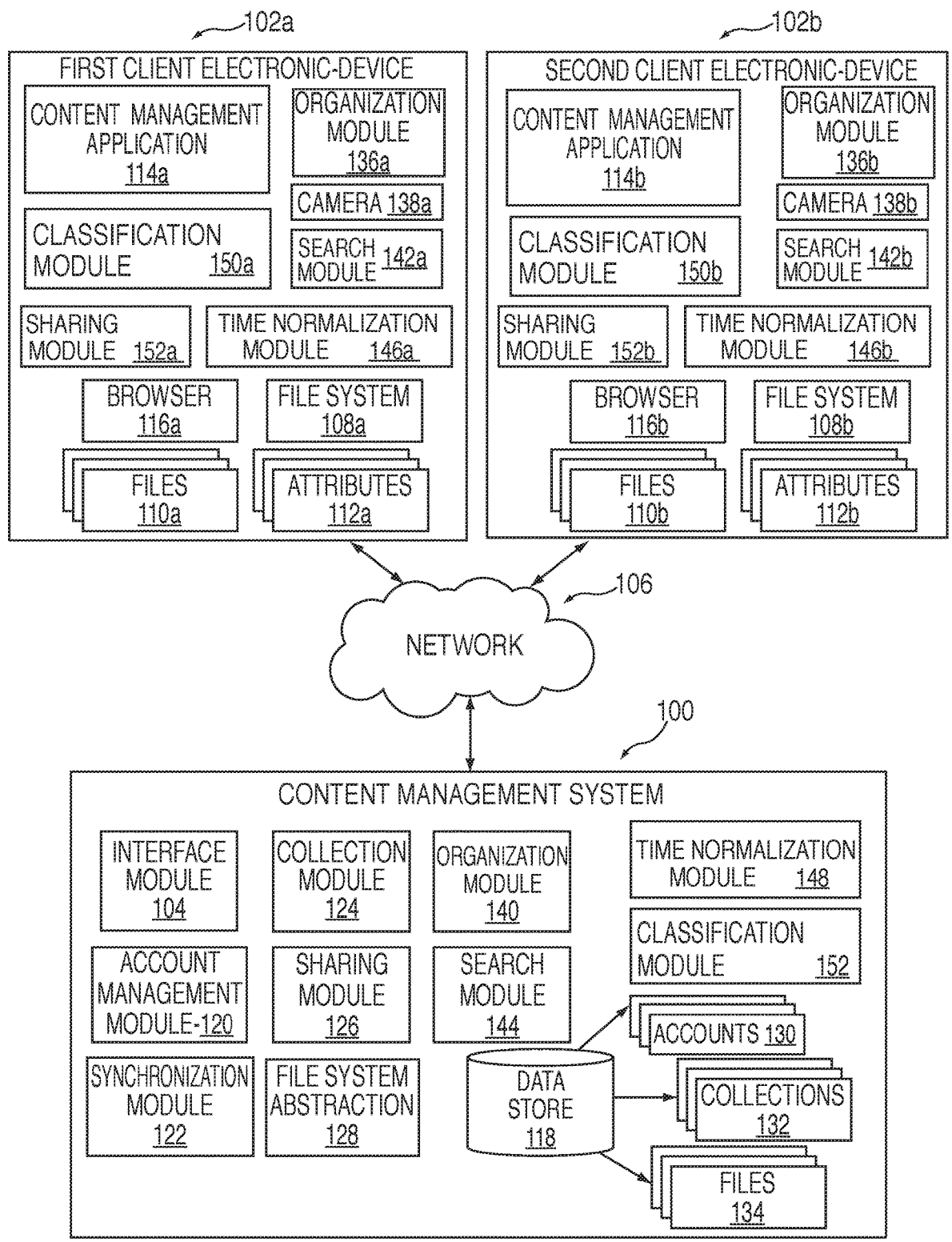
FIG. 1 is an exemplary system for a dropsite for shared content in accordance with some embodiments of the invention.

Methods, systems, and computer readable mediums for a dropsite for shared content are provided. A dropsite is a shared grouping of content items, such as a shared folder of content items, associated with a predefined geographical area and a predefined timespan. Upload to the shared folder of a content item may be permitted when the content item was created, generated, or captured with a date and time within the predefined span of time and at a location within the predefined geographical area for the shared folder. In this way, the shared folder may capture a shared experience allowing for meaningful social interaction between participants and viewers regarding the experience.

By way of example, a dropsite may be created for a bounded geographical area around a stadium, including a distance of twenty feet surrounding the stadium. The dropsite may be established for a series of championship games played at the stadium and the dropsite timespan may start the day before the championship games and run through the night of the last game to ensure the capture of the festivities/celebration through the last game. The dropsite may be discoverable by the public, and a device that comes near or within the geographical area may be notified as to existence of the dropsite as well as become eligible to contribute and access the dropsite. When the user enters the dropsite geographical area, the may be able to upload content created within the dropsite geographical area during a particular span of time. Content items uploaded may be clustered together using various parameters (e.g., by locations within a venue, time, etc.) and presented for display to a user's device, so that the user may view the experience as it unfolded at the dropsite geographical area.

In some embodiments, discovery, contribution, and/or access to the shared folder may be permitted with a device that is or has been near and/or within the predefined geographical area, an authenticated account, and/or any other identifier indicating authorization to discover, contribute, and/or access the shared folder. The shared folder may be publicly discoverable with a device near and/or within the predefined geographic area. Particular shared folders for dropsites may be discoverable and/or accessible for a set of users, authenticated accounts, and/or devices.

For purposes of description and simplicity, methods, systems and computer readable mediums will be described for a dropsite that utilizes a shared folder. The term "shared folder" is used herein to refer broadly to a variety of mechanisms, data structures, and methods for associating content items together to form a group, including, but not limited to, a virtual collection, an album, a directory, a lightweight share, and/or any other grouping of content items.

For purposes of description and simplicity, methods, systems and computer readable mediums will be described for a content storage and management service, and in particular, a dropsite for shared content. However, the terms "content storage service" and "content management system" are used herein to refer broadly to a variety of storage providers and management service providers as well as handling a wide variety of types of content, files, portions of files, and/or other types of data. Those with skill in the art will recognize that the methods, systems, and mediums described may be used for a variety of storage providers/services and types of content, files, portions of files, and/or other types of data.

FIG. 1 is an exemplary system for a dropsite in accordance with some embodiments of the invention. Elements in FIG. 1, including, but not limited to, first client electronic device 102a, second client electronic device 102b, and content management system 100 may communicate by sending and/or receiving data over network 106. Network 106 may be any network, combination of networks, or network devices that can carry data communication. For example, network 106 may be any one or any combination of LAN (local area network), WAN (wide area network), telephone network, wireless network, point-to point network, star network, token ring network, hub network, or any other configuration.

Network 106 can support any number of protocols, including but not limited to TCP/IP (Transfer Control Protocol and Internet Protocol), HTTP (Hypertext Transfer Protocol), WAP (wireless application protocol), etc. For example, first client electronic device 102a and second client electronic device 102b (collectively 102) may communicate with content management system 100 using TCP/IP, and, at a higher level, use browser 116 to communicate with a web server (not shown) at content management system 100 using HTTP. Examples of implementations of browser 116, include, but are not limited to, Google Inc. Chrome™ browser, Microsoft Internet Explorer®, Apple Safari®, Mozilla Firefox, and Opera Software Opera.

A variety of client electronic devices 102 can communicate with content management system 100, including, but not limited to, desktop computers, mobile computers, mobile communication devices (e.g., mobile phones, smart phones, tablets), televisions, set-top boxes, and/or any other network enabled device. Although two client electronic devices 102a and 102b are illustrated for description purposes, those with skill in the art will recognize that any number of devices may be used and supported by content management system 100. Client electronic devices 102 may be used to create, access, modify, and manage files 110a and 110b (collectively 110) (e.g. files, file segments, images, etc.) stored locally within file system 108a and 108b (collectively 108) on client electronic device 102 and/or stored remotely with content management system 100 (e.g., within data store 118). For example, client electronic device 102a may access file 110b stored remotely with data store 118 of content management system 100 and may or may not store file 110b locally within file system 108a on client electronic device 102a. Continuing with the example, client electronic device 102a may temporarily store file 110b within a cache (not shown) locally within client electronic device 102a, make revisions to file 110b, and the revisions to file 110b may be communicated and stored in data store 118 of content management system 100. Optionally, a local copy of the file 110a may be stored on client electronic device 102a.

Client devices 102 may capture, record, and/or store content items, such as image files 110. Client devices 102 may have a camera 138 (e.g., 138a and 138b) to capture and record digital images and/or videos. For example, camera 138 may capture and record images and store metadata with the images. Metadata may include, but is not limited to, the following: creation time timestamp, geolocation, orientation, rotation, title, and/or any other attributes or data relevant to the captured image.

Metadata values may be stored as attribute 112 name-value pairs, tag-value pairs, and/or any other method to associate the metadata with the file and easily identify the type of metadata. In some embodiments, attributes 112 may be tag-value pairs defined by a particular standard, including, but not limited to, Exchangeable Image File Format (Exif), JPEG File Interchange Format (Jfif), and/or any other standard.

A time normalization module 146 (e.g., 146a and 146b) may be used to normalize dates and times stored with a content item. An example of time normalization is provided in U.S. Provisional Patent Application No. 61/801,318, entitled "Date and Time Handling," filed on Mar. 15, 2013, and herein incorporated by reference in its entirety. The time normalization module 146, counterpart time normalization module 148, and/or any combination thereof may be used to normalize dates and times stored for content items. The normalized times and dates may be used to sort, group, perform comparisons, perform basic math, and/or cluster content items.

An organization module 136 (e.g., 136a and 136b) may be used to organize content items (e.g., image files) into clusters, organize content items to provide samplings of content items for display within user interfaces, and/or retrieve organized content items for presentation. An example of organization is described in U.S. Provisional Patent Application No. 61/794,184, entitled "Presentation and Organization of Content," filed on Mar. 15, 2013, and herein incorporated by reference in its entirety.

The organization module 136 may utilize any clustering algorithm. The organization module 136 may be used to identify similar images for clusters in order to organize content items for presentation within user interfaces on devices 102 and content management system 100. Similarity rules may be defined to create one or more numeric representations embodying information on similarities between each of the content items in accordance with the similarity rules. The organization module 136 may use the numeric representation as a reference for similarity between content items in order to cluster the content items.

In some embodiments, content items may be organized into clusters to aid with retrieval of similar content items in response to search requests. For example, organization module 136a may identify first and second images are similar and may be group the images together in a cluster. Organization module 136a may process image files to determine clusters independently or in conjunction with counterpart organization module (e.g., 140 and/or 136b). In other embodiments, organization module 136a may only provide clusters identified with counterpart organization modules (e.g., 140 and/or 136*b*) for presentation. Continuing with the example, processing of image files to determine clusters may be an iterative process that is executed upon receipt of new content items and/or new similarity rules.

In some embodiments, a search module 142 on client device 102 is provided with counterpart search module 144 on content management system 144 to support search for content items. A search request may be received by search module 142 and/or 144 that requests a content item. In some embodiments, the search may be handled by searching metadata and/or attributes assigned to content items during the provision of management services. For example, cluster markers stored with images may be used to find images by date. In particular, cluster markers may indicate an approximate time or average time for the images stored with the cluster marker in some embodiments, and the marker may be used to speed the search and/or return the search results with the contents of the cluster with particular cluster markers.

Files 110 managed by content management system 100 may be stored locally within file system 108 of respective devices 102 and/or stored remotely within data store 118 of content management system 100 (e.g., files 134 in data store 118). Content management system 100 may provide synchronization of files managed by content management system 100. Attributes 112*a* and 112*b* (collectively 112) or other metadata may be stored with files 110. For example, a particular attribute may be stored with the file to track files locally stored on client devices 102 that are managed and/or synchronized by content management system 100. In some embodiments, attributes 112 may be implemented using extended attributes, resource forks, or any other implementation that allows for storing metadata with a file that is not interpreted by a file system. In particular, an attribute 112*a* and 112*b* may be a content identifier for a file. For example, the content identifier may be a unique or nearly unique identifier (e.g., number or string) that identifies the file.

By storing a content identifier with the file, a file may be tracked. For example, if a user moves the file to another location within the file system 108 hierarchy and/or modifies the file, then the file may still be identified within the local file system 108 of a client device 102. Any changes or modifications to the file identified with the content identifier may be uploaded or provided for synchronization and/or version control services provided by the content management system 100.

A stand-alone content management application 114*a* and 114*b* (collectively 114), client application, and/or third-party application may be implemented to provide a user interface for a user to interact with content management system 100. Content management application 114 may expose the functionality provided with content management interface 104 and accessible modules for device 102. Web browser 116*a* and 116*b* (collectively 116) may be used to display a web page front end for a client application that can provide content management 100 functionality exposed/provided with content management interface 104.

Content management system 100 may allow a user with an authenticated account to store content, as well as perform management tasks, such as retrieve, modify, browse, synchronize, and/or share content with other accounts. Various embodiments of content management system 100 may have elements, including, but not limited to, content management interface module 104, account management module 120, synchronization module 122, collections module 124, sharing module 126, file system abstraction 128, data store 118, and organization module 140. The content management service interface module 104 may expose the server-side or back end functionality/capabilities of content management system 100. For example, a counter-part user interface (e.g., stand-alone application, client application, etc.) on client electronic devices 102 may be implemented using content management service interface 104 to allow a user to perform functions offered by modules of content management system 100. In particular, content management system 100 may have an organization module 140 for identifying similar content items for clusters and samples of content items for presentation within user interfaces.

The user interface offered on client electronic device 102 may be used to create an account for a user and authenticate a user to use an account using account management module 120. The account management module 120 of the content management service may provide the functionality for authenticating use of an account by a user and/or a client electronic device 102 with username/password, device identifiers, and/or any other authentication method. Account information 130 can be maintained in data store 118 for accounts. Account information may include, but is not limited to, personal information (e.g., an email address or username), account management information (e.g., account type, such as "free" or "paid"), usage information, (e.g., file edit history), maximum storage space authorized, storage space used, content storage locations, security settings, personal configuration settings, content sharing data, etc. An amount of content management may be reserved, allotted, allocated, stored, and/or may be accessed with an authenticated account. The account may be used to access files 110 within data store 118 for the account and/or files 110 made accessible to the account that are shared from another account. Account module 120 can interact with any number of other modules of content management system 100.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

Content items (e.g., files 110) can be stored in data store 118. Data store 118 can be a storage device, multiple storage devices, or a server. Alternatively, data store 118 can be cloud storage provider or network storage accessible via one or more communications networks. Content management system 100 can hide the complexity and details from client devices 102 by using a file system abstraction 128 (e.g., a file system database abstraction layer) so that client devices 102 do not need to know exactly where the content items are being stored by the content management system 100. Embodiments can store the content items in the same folder hierarchy as they appear on client device 102. Alternatively, content management system 100 can store the content items in various orders, arrangements, and/or hierarchies. Content management system 100 can store the content items in a network accessible storage (SAN) device, in a redundant array of inexpensive disks (RAID), etc. Content management system 100 can store content items using one or more partition types, such as FAT, FAT32, NTFS, EXT2, EXT3, EXT4, ReiserFS, BTRFS, and so forth.

Data store 118 can also store metadata describing content items, content item types, and the relationship of content items to various accounts, folders, collections, or groups. The metadata for a content item can be stored as part of the content item and/or can be stored separately. Metadata can be store in an object-oriented database, a relational database, a file system, or any other collection of data. In one variation, each content item stored in data store 118 can be assigned a system-wide unique identifier.

Data store 118 can decrease the amount of storage space required by identifying duplicate files or duplicate chunks of files. Instead of storing multiple copies, data store 118 can store a single copy of a file 134 and then use a pointer or other mechanism to link the duplicates to the single copy. Similarly, data store 118 can store files 134 more efficiently, as well as provide the ability to undo operations, by using a file version control that tracks changes to files, different versions of files (including diverging version trees), and a change history. The change history can include a set of changes that, when applied to the original file version, produce the changed file version.

Content management system 100 can be configured to support automatic synchronization of content from one or more client devices 102. The synchronization can be platform independent. That is, the content can be synchronized across multiple client devices 102 of varying type, capabilities, operating systems, etc. For example, client device 102a can include client software, which synchronizes, via a synchronization module 122 at content management system 100, content in client device 102 file system 108 with the content in an associated user account. In some cases, the client software can synchronize any changes to content in a designated folder and its sub-folders, such as new, deleted, modified, copied, or moved files or folders. In one example of client software that integrates with an existing content management application, a user can manipulate content directly in a local folder, while a background process monitors the local folder for changes and synchronizes those changes to content management system 100. In some embodiments, a background process can identify content that has been updated at content management system 100 and synchronize those changes to the local folder. The client software can provide notifications of synchronization operations, and can provide indications of content statuses directly within the content management application. Sometimes client device 102 may not have a network connection available. In this scenario, the client software can monitor the linked folder for file changes and queue those changes for later synchronization to content management system 100 when a network connection is available. Similarly, a user can manually stop or pause synchronization with content management system 100.

A user can also view or manipulate content via a web interface generated and served by user interface module 104. For example, the user can navigate in a web browser to a web address provided by content management system 100. Changes or updates to content in the data store 118 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 100 can include sharing module 126 for managing sharing content and/or collections of content publicly or privately. Sharing module 126 may manage sharing independently or in conjunction with counterpart sharing module (e.g., 152a and 152b). Sharing content publicly can include making the content item and/or the collection accessible from any computing device in network communication with content management system 100. Sharing content privately can include linking a content item and/or a collection in data store 118 with two or more user accounts so that each user account has access to the content item. The sharing can be performed in a platform independent manner. That is, the content can be shared across multiple client devices 102 of varying type, capabilities, operating systems, etc. The content can also be shared across varying types of user accounts. In particular, the sharing module 126 can be used with the collections module 124 to allow sharing of a virtual collection with another user or user account. A virtual collection may be a grouping of content identifiers that may be stored in various locations within file system of client device 102 and/or stored remotely at content management system 100.

The virtual collection for an account with a file storage service is a grouping of one or more identifiers for content items (e.g., identifying content items in storage). An example of virtual collections is described in provided in U.S. Provisional Patent Application No. 61/750,791, entitled "Presenting Content Items in a Collections View," filed on Jan. 9, 2013, and herein incorporated by reference in its entirety. The virtual collection is created with the collection module 124 by selecting from existing content items stored and/or managed by the file storage service and associating the existing content items within data storage (e.g., associating storage locations, content identifiers, or addresses of stored content items) with the virtual collection. By associating existing content items with the virtual collection, a content item can be designated as part of the virtual collection without having to store (e.g., copy and paste the content item file to a directory) the content item in another location within data storage in order to place the content item in the collection.

In some embodiments, content management system 100 can be configured to maintain a content directory or a database table/entity for content items where each entry or row identifies the location of each content item in data store 118. In some embodiments, a unique or a nearly unique content identifier may be stored for each content item stored in the data store 118.

Metadata can be stored for each content item. For example, metadata can include a content path that can be used to identify the content item. The content path can include the name of the content item and a folder hierarchy associated with the content item (e.g., the path for storage locally within a client device 102). In another example, the content path can include a folder or path of folders in which the content item is placed as well as the name of the content item. Content management system 100 can use the content path to present the content items in the appropriate folder hierarchy in a user interface with a traditional hierarchy view. A content pointer that identifies the location of the content item in data store 118 can also be stored with the content identifier. For example, the content pointer can include the exact storage address of the content item in memory. In some embodiments, the content pointer can point to multiple locations, each of which contains a portion of the content item.

In addition to a content path and content pointer, a content item entry/database table row in a content item database entity can also include a user account identifier that identifies the user account that has access to the content item. In some embodiments, multiple user account identifiers can be associated with a single content entry indicating that the content item has shared access by the multiple user accounts.

To share a content item privately, sharing module 126 can be configured to add a user account identifier to the content entry or database table row associated with the content item, thus granting the added user account access to the content item. Sharing module 126 can also be configured to remove user account identifiers from a content entry or database table rows to restrict a user account's access to the content item. The sharing module 126 may also be used to add and remove user account identifiers to a database table for virtual collections.

To share content publicly, sharing module 126 can be configured to generate a custom network address, such as a uniform resource locator (URL), which allows any web browser to access the content in content management system 100 without any authentication. To accomplish this, sharing module 126 can be configured to include content identification data in the generated URL, which can later be used to properly identify and return the requested content item. For example, sharing module 126 can be configured to include the user account identifier and the content path in the generated URL. Upon selection of the URL, the content identification data included in the URL can be transmitted to content management system 100 which can use the received content identification data to identify the appropriate content entry and return the content item associated with the content entry.

To share a virtual collection publicly, sharing module 126 can be configured to generate a custom network address, such as a uniform resource locator (URL), which allows any web browser to access the content in content management system 100 without any authentication. To accomplish this, sharing module 126 can be configured to include collection identification data in the generated URL, which can later be used to properly identify and return the requested content item. For example, sharing module 126 can be configured to include the user account identifier and the collection identifier in the generated URL. Upon selection of the URL, the content identification data included in the URL can be transmitted to content management system 100 which can use the received content identification data to identify the appropriate content entry or database row and return the content item associated with the content entry or database row.

In addition to generating the URL, sharing module 126 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 126 can be configured to change the value of the flag to 1 or true after generating a URL to the content item.

In some embodiments, sharing module 126 can also be configured to deactivate a generated URL. For example, each content entry can also include a URL active flag indicating whether the content should be returned in response to a request from the generated URL. For example, sharing module 126 can be configured to only return a content item requested by a generated link if the URL active flag is set to 1 or true. Changing the value of the URL active flag or Boolean value can easily restrict access to a content item or a collection for which a URL has been generated. This allows a user to restrict access to the shared content item without having to move the content item or delete the generated URL. Likewise, sharing module 126 can reactivate the URL by again changing the value of the URL active flag to 1 or true. A user can thus easily restore access to the content item without the need to generate a new URL.

Figure 2:
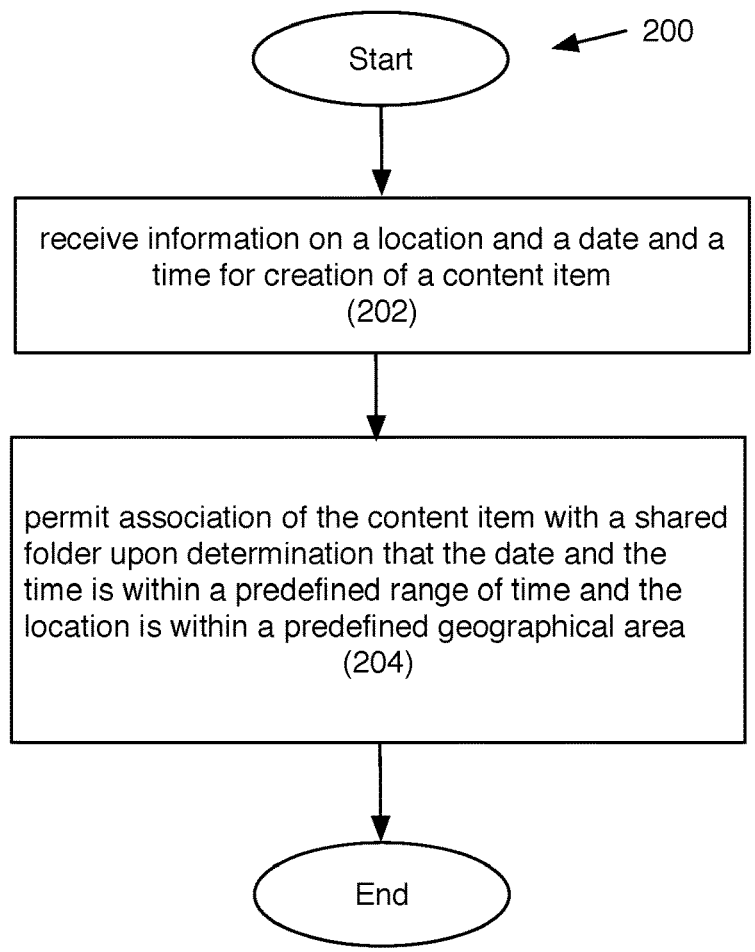
FIG. 2 is an exemplary flowchart for a dropsite for shared content in accordance with some embodiments of the invention.

FIG. 2 is an exemplary flowchart for a dropsite for shared content in accordance with some embodiments of the invention. Flowchart 200 describes a dropsite, in particular managing content contributed to the dropsite. Content management application 114 of client device 102 may expose the functionality of sharing modules 126 and/or 152 to provide the dropsite. Sharing module 126 may manage the dropsite for shared content either independently or in conjunction with sharing modules 152a and/or 152b (collectively 152). Requests made from device 102 using the user interface of content management application 114 for access and/or inclusion of a content item in the shared folder may be handled by sharing modules 126 and/or 152. The content item may be associated with the shared folder, such as to indicate inclusion of the content item in the shared folder, provided the content item meets predefined criteria established for the shared folder, including, but not limited to, creation of the content item within a geographical area and a particular span of time.

Continuing with reference to FIG. 2, information may be received containing a location and a date and a time of creation of a content item (202). Content items may be images, documents, messages, videos, SMS messages, emails, feeds, tweets, and/or any other data that may be created using the content management application 114 and/or third-party applications on device 102. Information on the location, date and time of creation may be received and used as criteria for inclusion or exclusion of a content item from the shared folder. For example, metadata having creation location and date/time information may be stored with image files or documents as attributes with values that may be retrieved and used to determine whether the content item may be part of the shared folder. Metadata associated with the content item (e.g., geographic location and date and time of its creation), metadata from the device, metadata provided by third-party application, and/or metadata provided by the content management system 100 on the content item may, for example, all be used as criteria for access, inclusion, and/or exclusion of the content item in the shared folder.

The content management system 100 and/or third party applications may obtain and/or generate the geographic location and/or date and time of creation information for the content item. Software applications, including, but not limited to, cameras, mail applications, social networking applications, editors, and/or any other type of application capable of creating the content item may provide the metadata for the content item. For example, an application may provide for geotagging to assign geographical location identification metadata to the content item.

In some embodiments, content management application 114 may obtain the location and/or the time and the date for the device 102 at the time of creation of the content item, either with the content management application service or a third party application, and may provide the information with the request to include the content item and/or provide metadata for storage as metadata with the stored content item. For example, content management application 114 may be operative on the device at the time of capture of the content item, in which case the system time of the device may be used as the time/date information for the content item. Content management application 114 may associate metadata with the content item, send the metadata, and/or otherwise communicate the metadata with the content item to the sharing modules 126 and/or 152. For example, content management application 114 may utilize location based services and/or location aware services of the device to determine location information for the content item.

Location information may include latitude and longitude coordinates, altitude, bearing, heading, distance, accuracy data, place names, neighborhood names, and any other data that indicates a location. The location information for the content item may be obtained through location-based services and/or location-aware services of the device, Wi-Fi crowd-sourcing, Global Positioning Services (GPS), cellular networks, any other service or mechanism for determining the location, and/or combination thereof. The date and the time information may be obtained from the device system time, a wireless service carrier, GPS, internet time services, and/or any other time source.

An association of the content item with a shared folder may be permitted upon determination that the date and the time is within a predefined span of time and the location is within a predefined geographical area for the shared folder (204). The content item may be associated with the shared folder to indicate or designate that the content item is included in the shared folder. By way of example, the content item may be associated with the shared folder by storing a reference or a pointer to content item in the data store 118 with an identifier for the shared folder, by storing the content item in a particular directory for the shared folder, and/or any other method or data structure for grouping content items in the shared folder.

Eligibility for inclusion in the shared folder may be determined by using the received creation information (e.g., creation date and time and creation location metadata) for the content item and comparing the information to predefined thresholds, bounded areas, limits, value ranges, time spans, value ranges, and/or any other definition for metadata values. The creation metadata may be within predefined thresholds, limits, fall within a value range, and/or time span to be eligible for inclusion in the shared folder. For example, the creation date and time of the content item may fall within the predefined time span (e.g., a week, a particular day, particular times, and/or any other measure of time) and the location at creation may need to be near or within a threshold distance (e.g., 15 miles) or adjacent set of areas (e.g., metropolitan Chicago, Paris' banlieues) from the predefined geographical area for the content item to be eligible for inclusion in the shared folder. If the received creation date and time metadata is within the predefined date and time span, and the location is within the predefined geographical area, then the content item is eligible to be associated with the shared folder. In some embodiments, content items permitted to be uploaded may be designated within a device user interface as being eligible for upload. Permitted content items may be uploaded to the content management system and stored as part of the shared folder.

Default predefined criteria definitions (e.g., thresholds, limits, spans, ranges, geographical area, and any other definition) may be provided and/or defined by a dropsite owner. For example, a dropsite owner may be affiliated with a given geographical area (e.g., owner, manager of a stadium, park, tourist bureau, etc.), an event planner, and/or any other user desiring to create a dropsite. The dropsite owner may pay for the space within the content management system for storing content items for the dropsite.

The predefined criteria definitions may be associated with a dropsite/shared folder identifier and retrieved from the data store 118 using the dropsite/shared folder identifier. The predefined geographical area may be a defined bounded geographical area or region. By way of example, the area may be defined with coordinates (e.g., latitude and longitude) for a center point and a span in latitudinal and longitudinal directions from the center point for the bounded area. In another example, the geographical area may be circular, semi-circular, elliptical, and/or any other shape with a center point and a defined radius and/or radii, or other locus of points satisfying some condition from or relative to the center point to form a bounded region. In yet another example, the dropsite can be defined in terms of political or municipal boundaries. The dropsite owner may define the geographical area by providing coordinate values for a center point and distances from the center point, pinpoint the geographic area using a map application that may generate center coordinates and distances extending out from the coordinates, and/or provide a name for venue, part of town, neighborhood, street names, park names, and/or any other name to retrieve a predefined geographical area.

In some embodiments, particular geographical areas used for a dropsite may be reserved for property owners and/or the government. In such cases, the dropsite owner may need to be authorized to associate the geographical area with the dropsite. For example, a dropsite owner may need to be authorized to create a dropsite for a monument, a stadium, a park, and/or property that is not owned by the dropsite owner.

Although examples are provided throughout this description for various inclusion criteria for content items in a shared folder in terms of location and date/time, those with skill in the art will recognize that there are other criteria and/or metadata that may be used to determine eligibility for a shared folder according to exemplary embodiments of the present invention.

Figure 3:
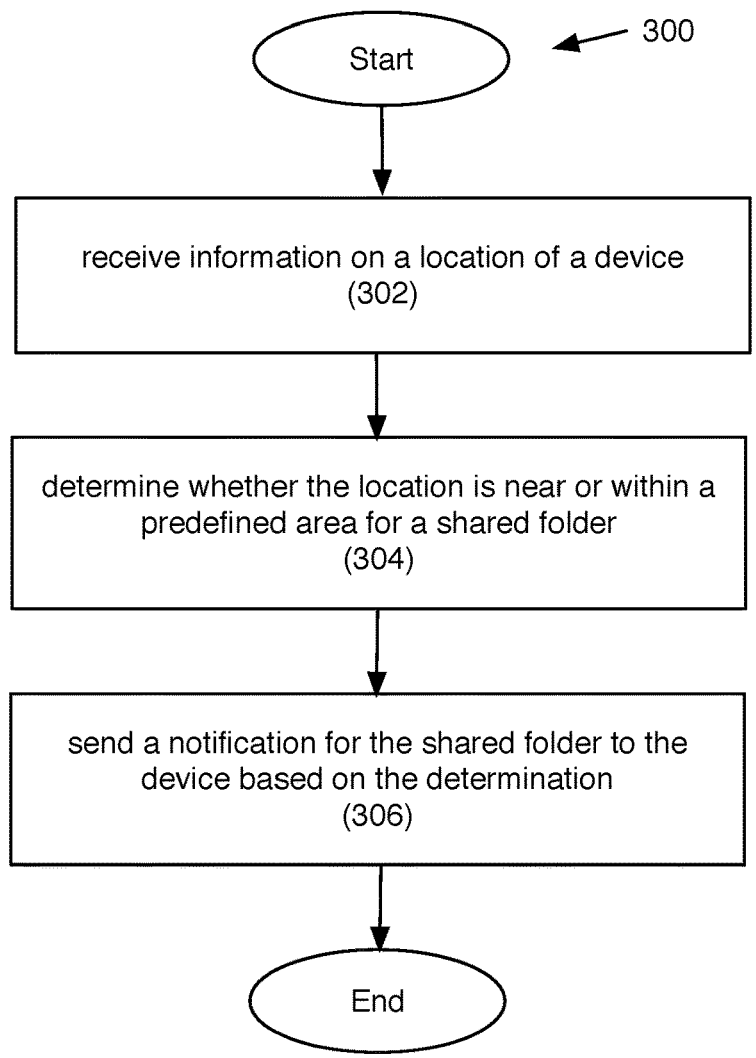
FIG. 3 is an exemplary flowchart for a dropsite for shared content in accordance with some embodiments of the invention.

FIG. 3 is an exemplary flowchart for a dropsite for shared content in accordance with some embodiments of the invention. Flowchart 300 illustrates exemplary steps involved in discovery of dropsites. With reference thereto, information on a location of a device may be received (302). Such location information may include latitude and longitude coordinates, for the approximate position of the device, for example. Location information for the device may be determined using crowd-sourced Wi-Fi, GPS, cellular networks, and/or any combination thereof to determine the approximate location for the device.

With the location information, a determination can be made as to whether the device is near or within a predefined geographical area for a shared folder (304). The predefined geographical area may be registered with a service to monitor the geographical area and determine whether the device is moved near or within the predefined geographical area. The service may be provided by a third party application, the content management application, and/or any other application. The service may continually monitor the geographical location to determine whether a device has entered or come near the area and log the movement of the device and/or the corresponding account using the device that came into or near the predefined geographical area. The device may need to be a threshold distance from the predefined geographical area to allow for discovery of a device. The dropsite owner may specify a threshold distance from the predefined geographical area and/or any other location. If the device location information indicates that the device is within a threshold distance and/or within the predefined geographical area, then the service monitoring the area may indicate the movement into or near the area.

A notification for the shared folder is sent to the device based on the determination (306). If the device is near or within the predefined geographical area for the shared folder, then the notification may be sent to the device to allow for discovery and/or publication of the shared folder with the device. The notification of the events may be text, images, and/or any other representation for the dropsite. Notifications may be pushed and/or pulled to the device in accordance with user settings and/or other settings for the content management application. In some embodiments, the content management application may be executing on the device and notifications may be pushed to the device. If the shared folder is public, then the shared folder may be accessible with the device. In some embodiments, a defined set of authenticated accounts, devices, and/or users may be permitted to discover particular shared folders. In yet other embodiments, the shared folder may be open and accessible to the public, and then subsequently limited to authorized accounts, and/or devices that entered or came near the predefined geographical area.

Although a particular examples are provided for determining a device location, defining a geographical area, and monitoring the area for devices, those with skill in the art will recognize that many methods, steps, mechanisms, and software libraries (e.g., IOS developer library) for determining the device location, defining the geographical area, and monitoring the predefined geographical area for devices that come near or within the predefined area.

Figure 4:
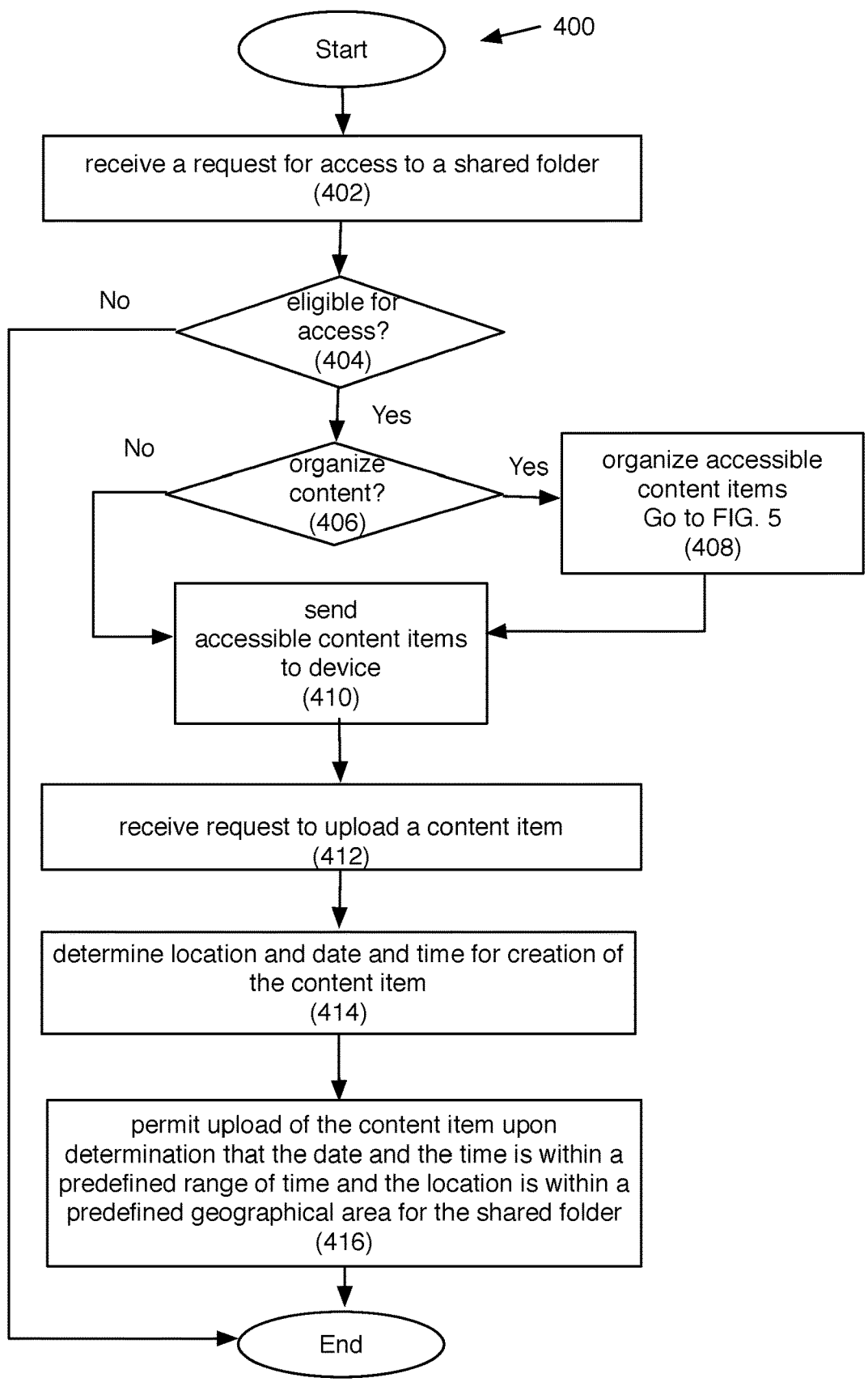
FIG. 4 illustrates an exemplary flowchart for a dropsite for shared content in accordance with some embodiments of the invention.

FIG. 4 illustrates an exemplary flowchart for a dropsite for shared content in accordance with some embodiments of the invention. Flowchart 400 illustrates steps in providing a dropsite. Initially, a request may be received to access a shared folder (402) The request may be received at the content management system 100 from a device using the content management application 114. A determination may then be made on eligibility for access to the shared folder (404). There are a number of criteria that may be used to determine if a device and/or an account are eligible for access to the shared folder. For example, if the device is near or within the predefined area, has previously been near or within the predefined area, has previously accessed the shared folder, then the device may be permitted for use to access the shared folder. In another example, if an authenticated account is eligible to access the shared folder, then the authenticated account may access the shared folder. Alternatively, if the device and/or account are not eligible, then the process ends.

Continuing with FIG. 4, a determination is made as to whether to organize content (406). Organization may be desired if an organized view of the experience is desired (e.g., a timeline view, etc.). A user may want to view a particular part of a venue at a particular time. For example, the user may desire to view the halftime show at a game. In another example, a user may desire to view current cocktails or dishes of the day at a restaurant that remain available, or images of the shoe rack at a store as it changes throughout a span of time for a day or a particular sale. Continuing with the examples, as dishes, cocktails, and shoes sold out, the user could keep track and have an accurate view of the availability for such items throughout the day and/or sale. If organization of content is desired (406), then accessible content items are organized (408), and organized accessible content items are sent to the device (410). Organization of accessible content items is described in detail in FIG. 5. Alternatively, if organization of content is not desired (406), then accessible content items are sent to the device (410). A user may desire a random view of the content items at the dropsite, and not desire organization. Accessible content items (410) may be accessed, viewed, modified, viewed, and/or locally stored on the device depending on permission set on the content items.

In some embodiments, content items from the shared folder may be desired to be stored locally on the device. For example, a user may request that the most popular ten content items for a shared folder be pushed to their device and stored locally. The content management system may continually update content items stored on the device. In another example, a user may request that content items from a predefined location within the predefined geographical area be stored locally on the device. Continuing with the example, the user may request the most popular, the most viewed, and/or any other criteria for the content items for storage locally on their device.

A request may be received to upload a content item to the shared folder (412). The location and date and time for creation of the content item may be determined (414). Upon determination that the date and the time is within a predefined range of time and the location is within a predefined geographical areas for the shared folder, upload of the content item may be permitted (416).

Figure 5:
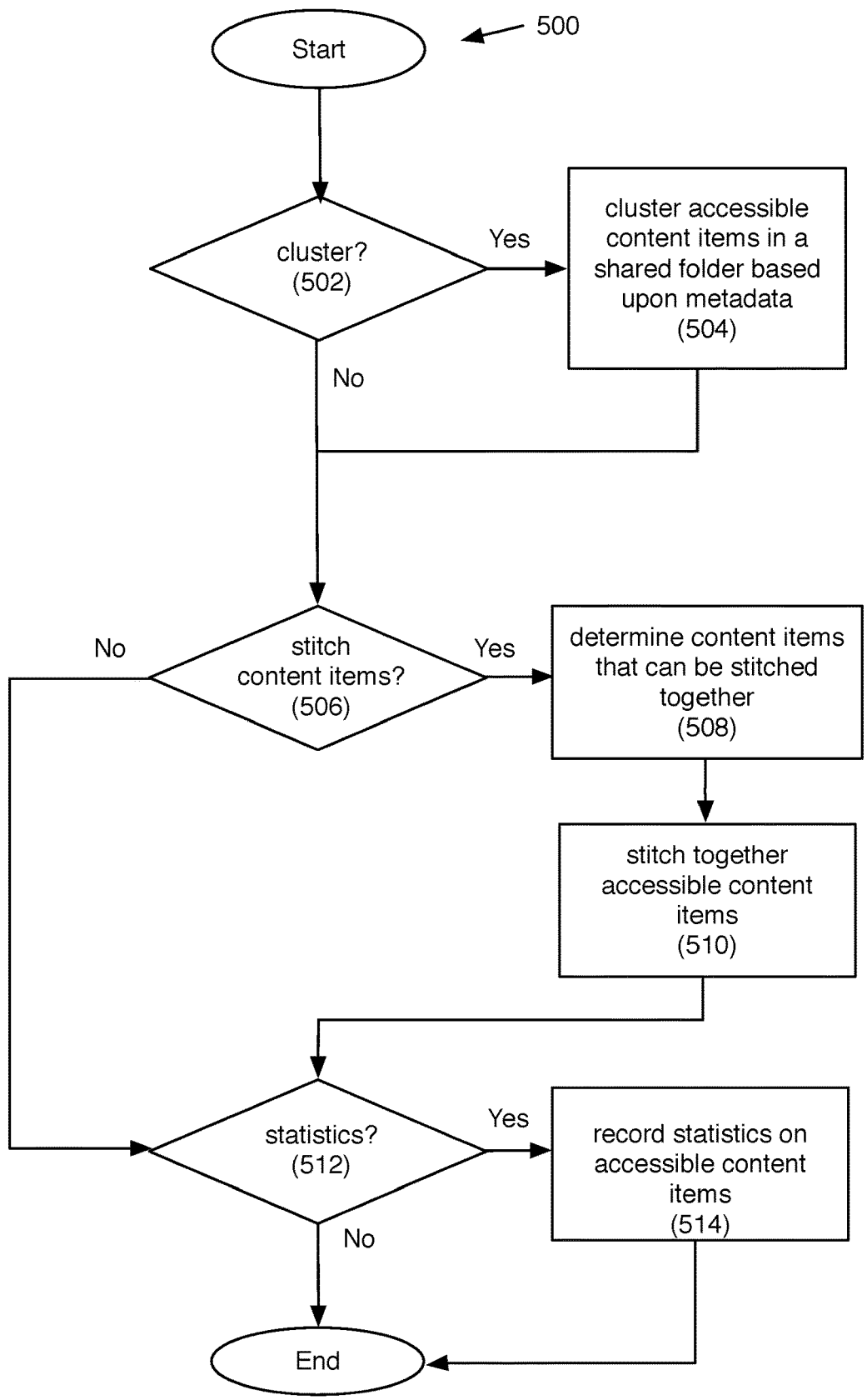
FIG. 5 illustrates an exemplary flowchart for a dropsite for shared content in accordance with some embodiments of the invention.

FIG. 5 illustrates an exemplary flowchart for dropsite functionality in accordance with some embodiments of the invention. Flowchart 500 illustrates exemplary steps for organizing the shared folder and generating statistics for the shared content. Initially a determination is made as to whether to cluster content items (502). If clustering is desired (502), then accessible content items in the shared folder may be clustered (504). Content items may be clustered together in groups by time, locations within the predefined geographic area, popularity of content items, face recognition, metadata of content items, and/or any other conditions or affinities that may be found between content items. Examples of conditions and affinities are provided in U.S. Provisional Patent Application No. 61/800,039, entitled "Shuffle Algorithm and Navigation," filed on Mar. 15, 2013, and herein incorporated by reference in its entirety. For example, content items may be clustered by time and locations within the predefined geographical area for the shared directory.

Content items that were created at the same time within the predefined geographical area may be grouped together and viewed as a grouping within the shared folder. Continuing with the example, by clustering content items (e.g., images) by location and time, a user can view the experience at the dropsite geographical area as it unfolds over time. The content items may be further clustered to group content items together that were created at locations within the predefined geographical area. Geographical coordinates for particular locations within a geographical area may be stored and associated with a name of the particular location. If the creation location (e.g., coordinates) of a content item fall within a predefined location of a predefined geographical area (e.g., falls within defined coordinates for the halftime stage at a stadium). By way of example, content items created near a halftime stage at a stadium may be grouped together and stored as being created at the halftime stage, and content items created near the concession stands may be grouped together. After clustering is performed, the process continues. Alternatively, if clustering is not desired (502), then the process continues.

Continuing with FIG. 5, a determination is made as to whether stitching of content items is desired (506). Stitching is the combination of multiple images with overlapping fields of view to produce a segmented panorama and/or a high resolution image. If stitching is desired (506), then a determination is made as to which content items from the shared folder are to be stitched together (508). Content items may be selected for stitching based upon matching features found in the images, images captured at locations separated by a distance that is below or at a particular threshold, images captured at times that are within a defined range of time, user selected content items, and/or any other criteria for selecting content items for stitching. For example, stitching can be performed with content items at a predefined location (e.g., location with camera oriented to capture half time stage) within a predefined geographical area, and using the location, orientation, and image data, images can be stitched together from one or more users to create a 360 degree view. In some embodiments, a user may select images and/or rules for stitching images. For example, the user may indicate a desire for images to be stitched together at a particular location by selecting the option to stitch together images at particular locations via the user interface. Default rules for stitching may be provided and/or a dropsite owner may indicate what stitching for particular locations and/or times are desired. Alternatively, if stitching is not desired at 506, then the process continues directly to 512.

Continuing with FIG. 5, a determination is made as to whether to generate statistics (512). If generation of statistics is desired (512), then statistics are created and recorded at 514. Statistics on popularity of content items, predefined locations within a predefined geographic area with the most content items captured or created, and/or any other statistics on content items may here be generated, for example. Histograms may be generated from the statistical data to provide a visualization of the data for the dropsite owner. In this way a dropsite owner may review data on the bulk of the activity at the event based on content items submitted to the dropsite. Following statistical generation at 514, process flow may end. Alternatively, if statistics are not desired at 512, then the process ends directly therefrom.

FIG. 6A is an exemplary schematic representation for storage of data for a dropsite for shared content in accordance with some embodiments of the invention.

One or more database entities can be used to store content items, shared data, dropsite shared folder data, attribute information, and/or metadata within data store 118 of FIG. 1, for example. In a relational database, an entity may be a database table or view. In an object database, the entity may map to an object class. The database table may be represented with columns that are fields for the database table and rows that represent the records of the database table. Each row or record in the database table may have one or more values for the database fields of the database table. Although examples provided throughout may refer to an entity as a database table, those skilled in the art will recognize that there are various ways an entity of a database design may be implemented.

SharedTable 600 is a database table for content items in dropsite shared folders stored within data store 118. SharedTable 600 may have the following database fields, for example: content sharer 604, shared item 606, shared folder 608, location 609, timestamp 610, active 612, and viewed 614. Sharing module 152 and 126 may be used to associate a shared folder and one or more shared items to create shared folders for dropsites. For example, a new row may be created when a new content item is shared and populated with values for content sharer 604, shared item 606, and shared folder 608 fields. The shared folder 608 may be a designated shared folder for a dropsite.

A user with an authenticated account or eligible device (e.g., based on location and time) may request to view a particular dropsite shared folder, and in response, a query is executed against the database to select content items in a shared folder (e.g., rows in sharedTable 600) where shared folder field 608 has the value for the particular shared folder identifier for a dropsite. The shared folder identifier may be an identifier for an album, a virtual collection, a lightweight share, and/or any other identifier for a grouping of one or more content items used for the dropsite. An album may be a group of content items stored within a folder or a directory on file system of client device 102 and/or stored remotely at content management system 100.

A lightweight share, akin to a virtual collection, may be a grouping of content identifiers that may be stored in various locations within file system of client device 102 and/or stored remotely at content management system 100. With the lightweight share identifier, all of the content items associated with the lightweight share identifier (e.g., stored with lightweight share identifier in data store) may be retrieved.

A sharing filter may be applied to retrieve a shared folder of content items for a dropsite using an authenticated account and/or eligible device (e.g., device eligible to upload content items due to presence near or within predefined geographical area during predefined timespan) from data storage. For example, shared folder may be retrieved from the database by executing a query against the database to retrieve a shared folder 608 that has a value with the shared folder identifier for a dropsite. The results from executing the query to select all rows from sharedTable 600 with a value of or associated with the shared folder identifier for a dropsite may be used to retrieve shared items for the dropsite. A sharer field 604 may have values for a user account identifier, an account identifier associated with a third party application, and/or any other identifier for an account permitted to share content for the dropsite.

By way of example, to apply a filter to retrieve shared content for shared folder identifier of "folder1," a query may be executed against the database for the shared folder identifier of "folder1," and three content items at rows 616, 618, and 619 may be retrieved for "folder1." As shown in row 616 of sharedTable 600, sharer 604 with a user account identifier "userId1" has an active content share as denoted with a "1"/True value in active 612 field. The active content share for the shared folder of row 616 has a shared item with identifier "Item100b." The shared item is not viewed as denoted by viewed 614 flag set to "0"/False in row 616. The timestamp 610 may indicate a creation date for the shared content item and the location 609 may have coordinates for the location at creation of the content item. The timestamp 610 may indicate a date within the predefined timespan (e.g., field TimeAndDate 654 of DropsiteTable 603) for the dropsite, as described in detail below with FIG. 6B. The location 609 may have coordinates that are within the predefined geographical area (e.g., field Geographic Area 652 of DropsiteTable 603) for the dropsite, as described in detail below with FIG. 6B.

Continuing with the retrieval of shared content example for shared folder of "folder1," as shown with row 618 of sharedTable 600 with user account identifier "userId2" has a shared item 606 of "Item200b" that is currently active 612 as indicated by "1"/True value for active flag 612 in row 618. Row 619 of sharedTable 600 with user account identifier "userId1" has a shared item 606 "Item100a" is currently not active 612 and not viewed 614. Each row of sharedTable 600 (e.g., rows 616, 618, and 619) was eligible and uploaded for shared folder "Folder1" of the dropsite of row 644 of the DropsiteTable 603, as described in detail below with FIG. 6B.

ContentItemTable 602 is a database table for content items stored within data store 118. ContentItemTable 602 has database fields depicted as follows: userId 620, contentItemId 622, originalContenitemId 624, currentSynchCopy 626, active flag 628, deviceId 630, revision 632, and content pointer 634. ContentItemTable 602 may remotely store content items that are both synchronized and unsynchronized content items stored locally on a device. As shown in row 636, contentItemId "200b" is the current synchronized copy as denoted with "1/True" with field currentSynchCopy 626. Instead, contentItemId "200b" is a locally stored version on device with identifier "mobile1" as denoted in DeviceId 630 field. Alternatively, as shown in row 638, version with contentItemId 622 identifier "100b" is the current synchronized copy as denoted by "1/True" in the currentSynchCopy 626 field. In row 640, an inactive content item version with contentItemId 622 "100a" is provided.

ContentItemTable 602 may also provide information on related content items. For example, as shown in rows 638 and 640, content items with contentItemId 622 100a-b are related because each has originalContentId "100." Content items may be selectively synchronized from a client device to the shared folder of a dropsite. If synchronization is desired, then an update and/or modification to a content item shared with the dropsite shared folder may be reflected. For example, a user may have removed red eye from an image content item (e.g., content item with contentItemId "100a") shared with the shared folder of the dropsite, and the update to the image may be reflected as a new version of the content item (e.g., content item with contentItemId "100b") that may be selectively provided to local folders of users that have saved the content item locally on their client device.

An index may be created for a database column or field of a database table to optimize the retrieval of data. In a preferred embodiment, use of the index may allow for retrieval of data without a full scan of a database table and/or a full scan of data accessible. Indexes may be created for the entire database column (e.g. for all data rows) and/or for a portion of the database column (e.g. a subset of data rows). For example, the index may be created for a subset of values for a column of a database table that are for a particular shared folder of a dropsite.

A database cursor may be used to keep track of the current state for content items locally stored on a client device within the file system of the client device and/or cache of the client device. For example, the database cursor may point to a row in a database for a shared folder at particular point in time that is currently stored within a cache on a client device. With knowledge of the cached version, updates to the content items of the shared folder can be sent to the client device.

Those with skill in the art will recognize that sharedTable 600 and contentItemTable 602 are meant to illustrate an exemplary storage mechanism where content in shared folders of a dropsite and other metadata associated with content items of shared folders may be stored and modified.

FIG. 6B is an exemplary schematic representation for storage of data for a dropsite for shared content in accordance with some embodiments of the invention. DropsiteTable 603 is a database table for defining dropsite shared folders stored within data store 118. DropsiteTable 603 may have database fields as follows, for example: shared folder 650, geographic area 652, time and date 654, current 656, active 658, ownerId 660, and public 662. Row 644 provides a definition for shared folder 650 "Folder1" created by owner with owner Id 660 "userId1" with Geographic area 652 defined with "AreaCoordinatesA" and TimeAndDate 654 range for the shared folder of "08:00:00 to 24:00:00 May 15, 2012." The bounded geographic area may be defined with coordinates for a center point and a radius distance around the center point to form a circular bounded area.

Figure 7:
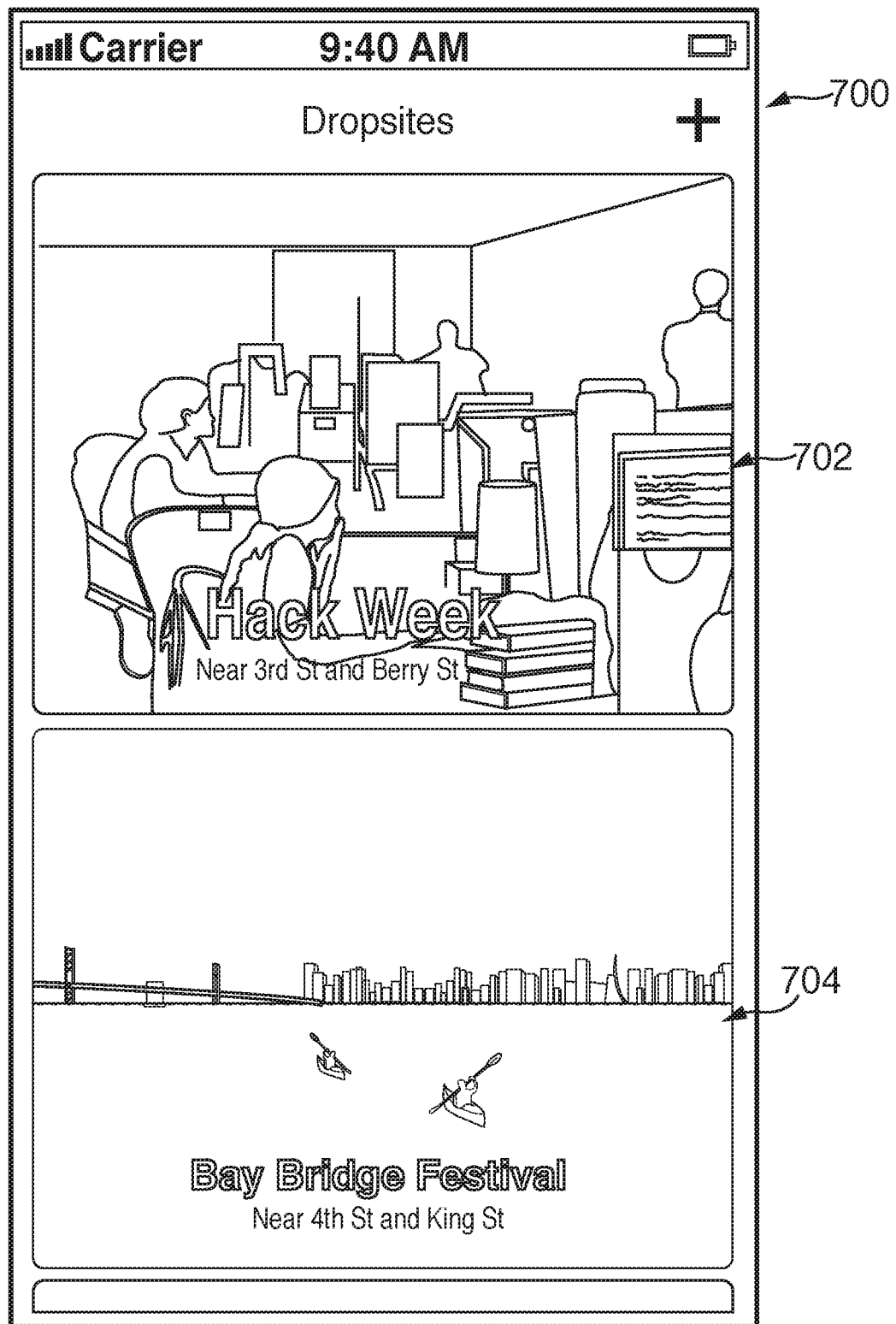
FIG. 7 is an exemplary user interface for a dropsite for shared content in accordance with some embodiments of the invention.

FIG. 7 is an exemplary user interface for a dropsite for shared content in accordance with some embodiments of the invention. User interface 700 displays representative images for two example dropsites: "Hack Week" 702 and "Bay Bridge Festival" 704.

Figure 8:
FIG. 8 is an exemplary user interface for a dropsite for shared content in accordance with some embodiments of the invention.

FIG. 8 is an exemplary user interface for a dropsite for shared content in accordance with some embodiments of the invention. User interface 800 displays content items within shared folder for dropsite "Hack Week" 802 with clusters of images for predefined locations within the predefined geographic area for the dropsite: "Lounge" 804 and "Conference Room" 806. Photos may be added to the shared folder by capturing the image using user control 808 and/or added to the shared folder with user control 810.

Figure 9:
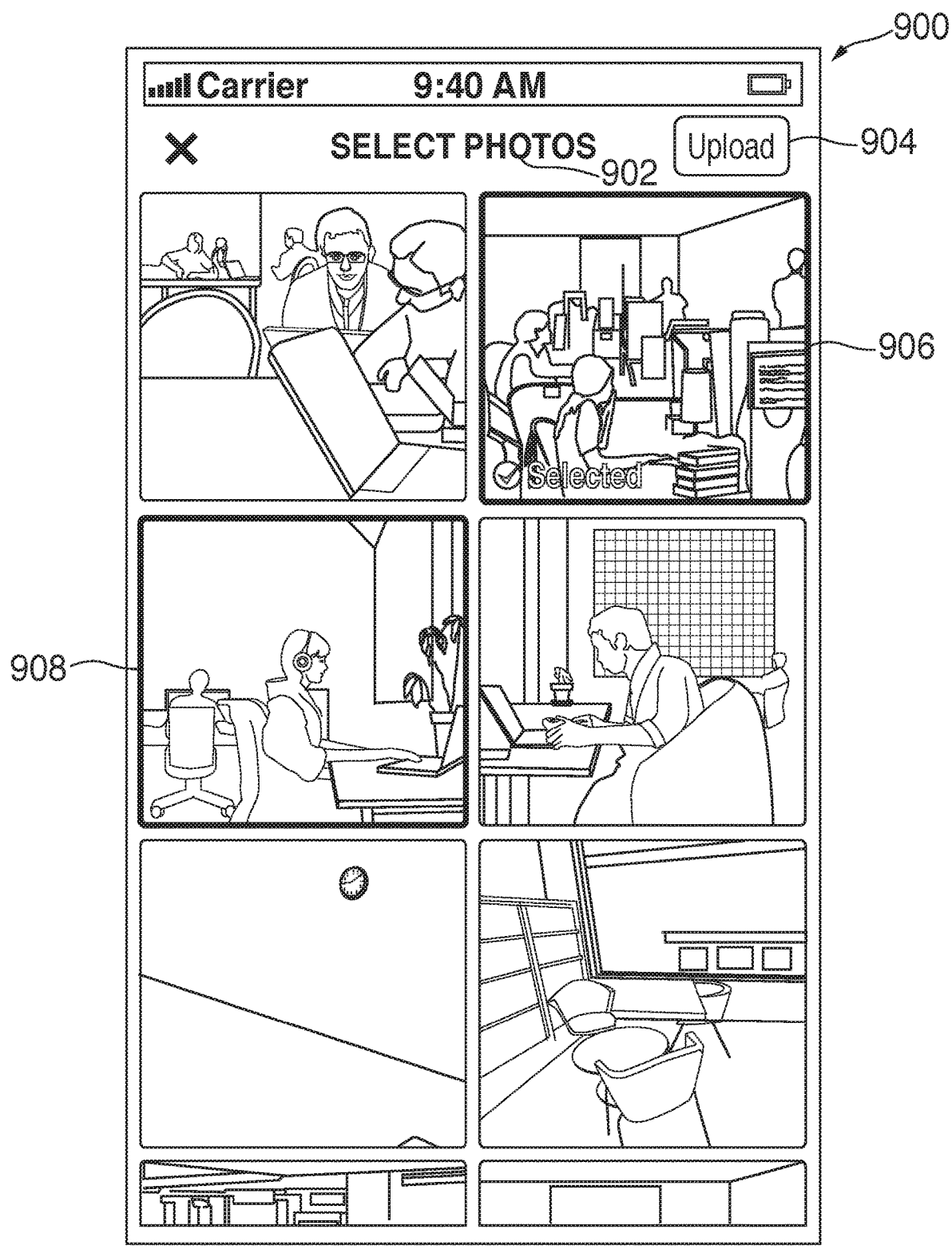
FIG. 9 is an exemplary user interface for a dropsite for shared content in accordance with some embodiments of the invention.

FIG. 9 is an exemplary user interface for a dropsite for shared content in accordance with some embodiments of the invention. User interface 900 for selecting photos as denoted by the title "Select Photos" 902. The user interface 900 allows for selection of two images 906 and 908 that are eligible to be uploaded in accordance with the creation metadata for the images. Image 906 is selected and a request to upload the image may be requested with user control 904.

Figure 10:
FIG. 10 is an exemplary user interface for a dropsite for shared content in accordance with some embodiments of the invention.

FIG. 10 is an exemplary user interface for a dropsite for shared content in accordance with some embodiments of the invention. User interface 1000 shows the status of uploading with the status bar 1002.

Figure 11:
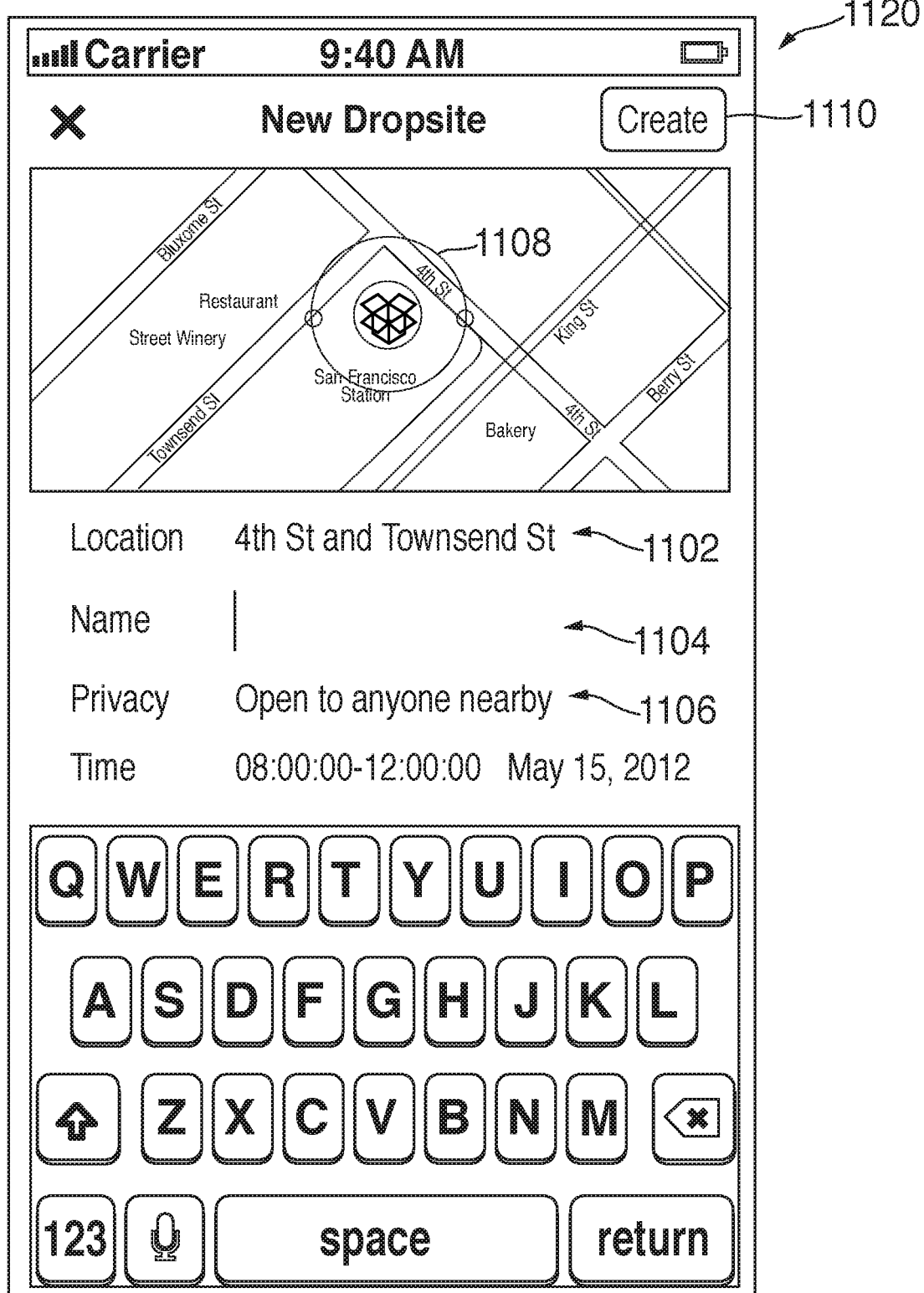
FIG. 11 is an exemplary user interface for a dropsite for shared content in accordance with some embodiments of the invention.

FIG. 11 is an exemplary user interface for a dropsite for shared content in accordance with some embodiments of the invention. User interface 1100 provides a way for creating a dropsite. A name 1104 for the dropsite may be input at input text box 1104 for dropsite at location name in text box 1102 of "$4^{th}$ and Townsend St." The dropsite has a text box 1106 for privacy with an inputted value of "Open to anyone nearby" and a predefined time range input of "08:00:00-12:00:00 May 15, 2012" at input box 1112. The bounded geographic area is defined by placing a circular area 1108 on the map.

Figure 12:
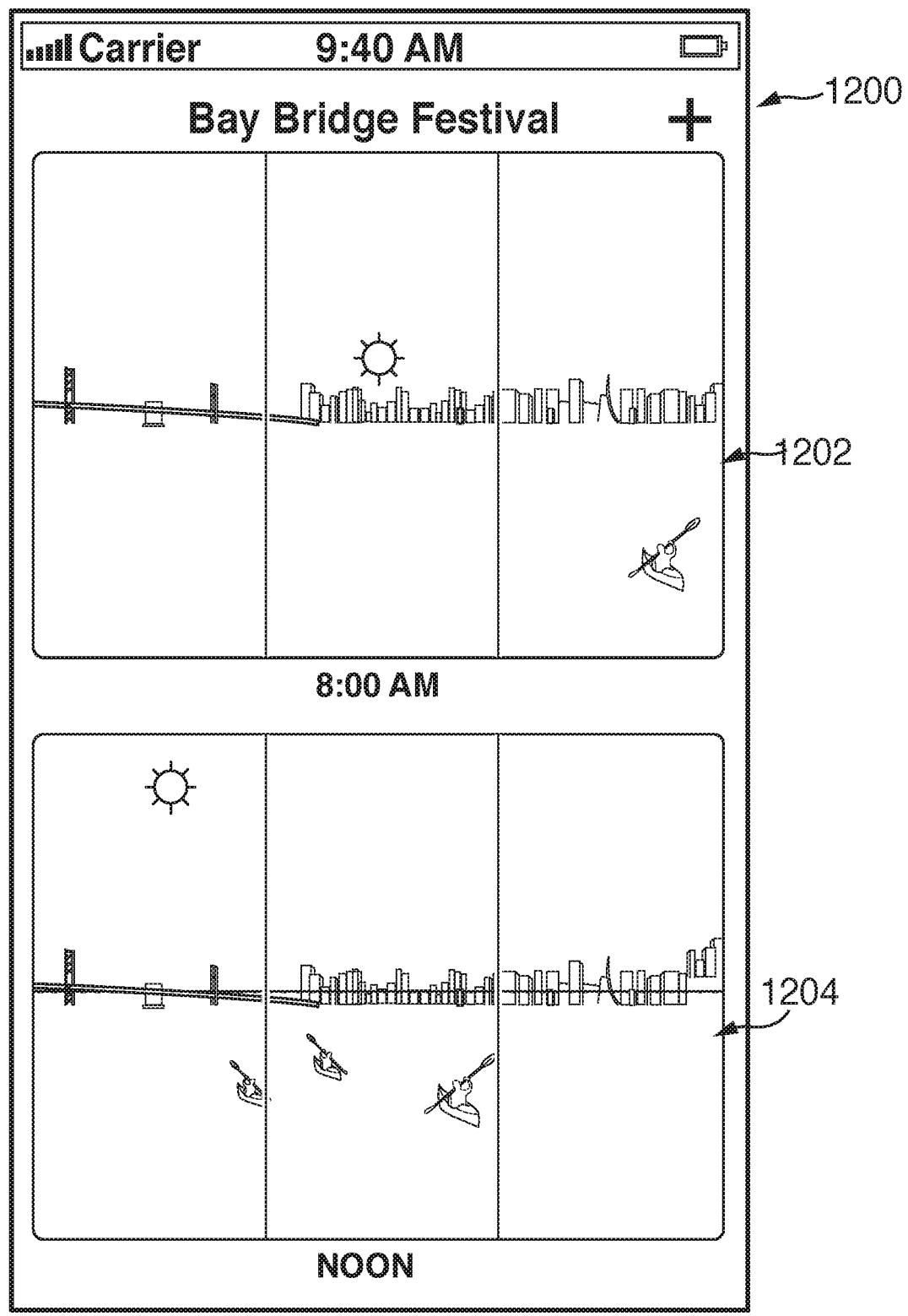
FIG. 12 is an exemplary user interface for a dropsite for shared content in accordance with some embodiments of the invention.

FIG. 12 is an exemplary user interface for a dropsite for shared content in accordance with some embodiments of the invention. User interface 1200 provides a dropsite with images clustered by time 1202 and 1204 that are stitched together.

Exemplary Implementations

Any suitable programming language can be used to implement the routines of particular embodiments including, but not limited to, the following: C, C++, Java, JavaScript, Python, Ruby, CoffeeScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time Particular embodiments may be implemented in a computer-readable storage device or non-transitory computer readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods for dropsite for shared content thereof, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed is:

1. A method for adding content items to a folder in a content management system, the method comprising:
receiving a predefined timestamp range associated with the folder;
monitoring, by the content management system, a predefined geographical area for devices moving within the predefined geographical area, the predefined geographical area associated with the folder stored on the content management system;
determining, by the content management system based on the monitoring, that a device has moved within the predefined geographical area based on a location of the device;
responsive to determining that the device has moved within the predefined geographical area, sending a notification for display on the device, the notification including a message indicating that the folder can be discovered by the device; and
receiving, from the device by the content management system, a content item to be stored in the folder, and wherein receiving the content item comprises:
receiving, by the content management system from the device, a request to upload the content item to the folder;
responsive to determining that a timestamp associated with a creation of the content item being within the predefined timestamp range, permitting the request to upload additional content item; and
after receiving the content item, storing, by the content management system, the content item in the folder.

2. The method of claim 1, further comprising:
receiving a request for the content item from an additional device; and
providing the content item to the additional device.

3. The method of claim 1, wherein the predefined geographical area is associated with an additional folder, and further comprising:
determining, by the content management system based on the monitoring, that an additional device has moved within a threshold distance of the predefined geographical area based on a location of the additional device;
responsive to determining that the additional device has moved within the threshold distance, sending a notification for display on the additional device, the notification including a message indicating that the additional folder can be discovered by the additional device; and
receiving, from the additional device by the content management system, a content item to be stored in the additional folder.

4. The method of claim 1, further comprising:
receiving, from an additional device by the content management system, an additional content item to be stored in the folder; and
stitching the content item received from the device and additional content item together.

5. The method of claim 1, wherein the predefined geographical area is associated with an additional folder, and further comprising:
receiving, by the content management system from an additional device, a request to upload an additional content item from the additional device to the additional folder;
determining, by the content management system, that the additional device is not within the predefined geographical area based on a location of the additional device; and
responsive to determining that the additional device is not within the predefined geographical area,
denying the request to upload the additional content item.

6. The method of claim 1, wherein the predefined geographical area is associated with an additional folder, and further comprising:
receiving, by the content management system from an additional device, a request to upload an additional content item from the additional device to the additional folder; and
responsive to determining that a location associated with the creation of the additional content item not being within the predefined geographical area, denying the request to upload the additional content item.

7. The method of claim 1, wherein the device is associated with a first user account identifier, and further comprising:

receiving, by the content management system from an additional device associated with a second user account identifier, a request to synchronize contents of the folder with the additional device; and responsive to determining that the additional device associated with the second user account identifier is authorized to access the folder, synchronizing the contents of the folder with the additional device.

8. The method of claim 1, wherein the folder is accessible only to authorized users of the content management system, and wherein sending the notification to the device is further responsive to a determination that a user of the device is an authorized user.

9. The method of claim 1, wherein receiving the content item comprises:

receiving, by the content management system from the device, a request to upload the content item to the folder;

responsive to determining that a location associated with the creation of the content item being within the predefined geographical area, permitting the requested upload; and after receiving the content item, storing, by the content management system, the content item in the folder.

10. A computer program product for adding content items to a folder in a content management system, the computer program product stored on a non-transitory computer-readable medium and including code configured to cause a processor to execute steps comprising:

receiving a predefined timestamp range associated with the folder;

monitoring, by the content management system, a predefined geographical area for devices moving within the predefined geographical area, the predefined geographical area associated with the folder stored on the content management system;

determining, by the content management system based on the monitoring, that a device has moved within the predefined geographical area based on a location of the device;

responsive to determining that the device has moved within the predefined geographical area, sending a notification for display on the device, the notification including a message indicating that the folder can be discovered by the device; and receiving, from the device by the content management system, a content item to be stored in the folder, and wherein receiving the content item comprises:

receiving, by the content management system from the device, a request to upload the content item to the folder;

responsive to determining that a timestamp associated with a creation of the content item being within the predefined timestamp range, permitting the request to upload additional content item; and after receiving the content item, storing, by the content management system, the content item in the folder.

11. The computer program product of claim 10, wherein the steps further comprise:

receiving a request for the content item from an additional device; and providing the content item to the additional device.

12. The computer program product of claim 10, wherein the predefined geographical area is associated with an additional folder, and the steps further comprise:

determining, by the content management system based on the monitoring, that an additional device has moved within a threshold distance of the predefined geographical area based on a location of the additional device;

responsive to determining that the additional device has moved within the threshold distance, sending a notification for display on the additional device, the notification including a message indicating that the additional folder can be discovered by the additional device; and receiving, from the additional device by the content management system, a content item to be stored in the additional folder.

13. The computer program product of claim 10, wherein the steps further comprise:

receiving, from an additional device by the content management system, an additional content item to be stored in the folder; and stitching the content item received from the device and additional content item together.

14. The computer program product of claim 10, wherein the predefined geographical area is associated with an additional folder, and the steps further comprise:

receiving, by the content management system from an additional device, a request to upload an additional content item from the additional device to the additional folder;

determining, by the content management system, that the additional device is not within the predefined geographical area based on a location of the additional device; and responsive to determining that the additional device is not within the predefined geographical area, denying the request to upload the additional content item.

15. The computer program product of claim 10, wherein the predefined geographical area is associated with an additional folder, and the steps further comprise:

receiving, by the content management system from an additional device, a request to upload an additional content item from the additional device to the additional folder; and responsive to determining that a location associated with the creation of the additional content item not being within the predefined geographical area, denying the request to upload the additional content item.

16. The computer program product of claim 10, wherein the device is associated with a first user account identifier, and the steps further comprise:

receiving, by the content management system from an additional device associated with a second user account identifier, a request to synchronize contents of the folder with the additional device; and responsive to determining that the additional device associated with the second user account identifier is authorized to access the folder, synchronizing the contents of the folder with the additional device.

17. The computer program product of claim 10, wherein the folder is accessible only to authorized users of the content management system, and wherein sending the notification to the device is further responsive to a determination that a user of the device is an authorized user.

18. The computer program product of claim 10, wherein receiving the content item comprises:

receiving, by the content management system from the device, a request to upload the content item to the folder;

responsive to determining that a location associated with the creation of the content item being within the predefined geographical area, permitting the requested upload; and after receiving the content item, storing, by the content management system, the content item in the folder.

* * * * *